(12) United States Patent
Gong et al.

(10) Patent No.: US 9,282,232 B2
(45) Date of Patent: Mar. 8, 2016

(54) COLLABORATIVE IMAGE CONTROL

(71) Applicants: Michelle X. Gong, Sunnyvale, CA (US); Roy Want, Los Altos, CA (US); Horst W. Haussecker, Palo Alto, CA (US); Jesse Walker, Hillsboro, OR (US); Sai P. Balasundaram, Beaverton, OR (US)

(72) Inventors: Michelle X. Gong, Sunnyvale, CA (US); Roy Want, Los Altos, CA (US); Horst W. Haussecker, Palo Alto, CA (US); Jesse Walker, Hillsboro, OR (US); Sai P. Balasundaram, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 72 days.

(21) Appl. No.: 14/306,649

(22) Filed: Jun. 17, 2014

(65) Prior Publication Data

US 2014/0293013 A1   Oct. 2, 2014

Related U.S. Application Data

(63) Continuation of application No. 13/077,372, filed on Mar. 31, 2011, now Pat. No. 8,755,785.

(51) Int. Cl.
| | |
|---|---|
| *H04M 3/00* | (2006.01) |
| *H04N 5/232* | (2006.01) |
| *H04N 5/247* | (2006.01) |
| *H04N 21/242* | (2011.01) |
| *H04N 21/414* | (2011.01) |
| *H04N 21/4223* | (2011.01) |

(Continued)

(52) U.S. Cl.
CPC ........... *H04N 5/23206* (2013.01); *H04N 5/247* (2013.01); *H04N 13/0282* (2013.01); *H04N 21/242* (2013.01); *H04N 21/41407* (2013.01); *H04N 21/4223* (2013.01); *H04N 21/4788* (2013.01)

(58) Field of Classification Search
USPC ......................................................... 455/420
See application file for complete search history.

(56) References Cited

U.S. PATENT DOCUMENTS

| | | |
|---|---|---|
| 4,251,801 A | 2/1981 | Le Mair et al. |
| 6,014,376 A | 1/2000 | Abreu et al. |

(Continued)

FOREIGN PATENT DOCUMENTS

| | | |
|---|---|---|
| CN | 1744670 A | 3/2006 |
| TW | 200302664 A | 8/2003 |
| TW | 201039048 A | 11/2010 |

OTHER PUBLICATIONS

International Search Report and Written Opinion received for PCT application No. PCT/US2011/066815, mailed on Jun. 12, 2012, 10 Pages.

(Continued)

*Primary Examiner* — Joel Ajayi
(74) *Attorney, Agent, or Firm* — Jordan IP Law, LLC

(57) ABSTRACT

Systems and methods of conducting collaborative sessions between mobile devices may provide for determining a time delay associated with a set of participating mobile devices, and determining a command execution time based at least in part on a clock of a managing device and the time delay. One or more control messages may be transmitted to the participating mobile devices, wherein the control messages include the command and the command execution time. Upon receiving a control message, each participating mobile device may determine a local execution time based at least in part on the command execution time and an offset of the clock of the managing device relative to a local clock. Execution of the command can therefore be coordinated across the set of participating mobile devices.

20 Claims, 4 Drawing Sheets

(51) Int. Cl.
*H04N 21/4788* (2011.01)
*H04N 13/02* (2006.01)

(56) References Cited

U.S. PATENT DOCUMENTS

| | | |
|---|---|---|
| 6,069,887 A | 5/2000 | Geiger et al. |
| 6,236,623 B1 | 5/2001 | Read et al. |
| 2003/0045303 A1 | 3/2003 | Oda et al. |
| 2005/0125098 A1 | 6/2005 | Wang et al. |
| 2006/0123297 A1 | 6/2006 | Reichert et al. |
| 2007/0153090 A1 | 7/2007 | Liow et al. |
| 2007/0223428 A1 | 9/2007 | Patterson et al. |
| 2008/0070550 A1 | 3/2008 | Hose |
| 2008/0216125 A1 | 9/2008 | Li et al. |
| 2011/0040997 A1 | 2/2011 | Baumgartl et al. |
| 2012/0075439 A1 | 3/2012 | Gong et al. |

OTHER PUBLICATIONS

International Preliminary report on Patentability received for PCT Patent Application No. PCT/US2011/066815, mailed on Oct. 10, 2013, 7 pages.

Office Action received for Taiwanese Patent Application No. 100148361, mailed on Dec. 18, 2014, 18 pages of Office Action including 6 pages of English Translation.

COLLABORATIVE IMAGE CONTROL

CROSS-REFERENCE TO RELATED APPLICATIONS

This application is a continuation of U.S. patent application Ser. No. 13/077,372, entitled "COLLABORATIVE IMAGE CONTROL," filed Mar. 31, 2011, and issued on Jun. 17, 2014 as U.S. Pat. No. 8,755,785, and is related to U.S. patent application Ser. No. 12/888,832, filed Sep. 23, 2010.

BACKGROUND

1. Technical Field

Embodiments generally relate to synchronizing operation of mobile devices. In particular, embodiments relate to the transfer of control messages between mobile devices to manage synchronized operation.

2. Discussion

Images from multiple digital cameras may be compiled together to generate a higher quality picture (e.g., via super resolution), to capture a stereo image pair across two independent cameras, or to generate a 3D (three dimensional) model from pictures taken with several cameras at the same time. Time synchronization between the cameras, however, can be challenging, particularly in peer-to-peer (P2P) environments in which a network-based time reference may not be available. Even if an effective mechanism for time synchronization may be available, there remains considerable room for improvement with respect to control protocols for enabling collaborative photography between multiple cameras.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
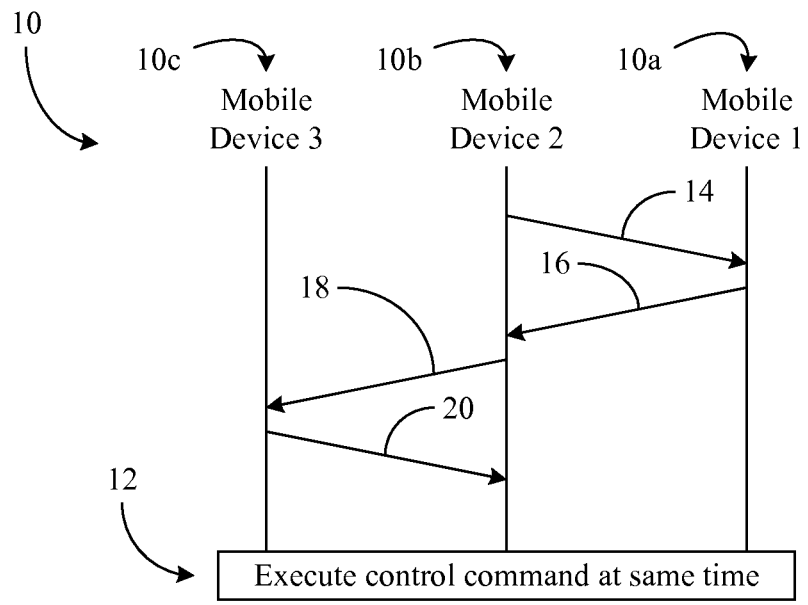
FIG. 1 is a timing diagram of an example of a control messaging protocol according to an embodiment.

Embodiments may include a non-transitory computer readable storage medium including a set of instructions which, if executed by a processor, cause a local mobile device to determine a time delay associated with a set of one or more remote mobile devices and determine a local execution time for a command based at least in part on a local clock and the time delay. The instructions can also cause a local mobile device to transmit a control message to the set of mobile devices, wherein the control message is to include the command and the local execution time. In addition, the instructions may cause a local mobile device to execute the command in accordance with the local execution time.

Embodiments may also include a system having a local clock and control logic to determine a time delay associated with a set of one or more remote mobile devices. The control logic can also determine a local execution time for a command based at least in part on the local clock and the time delay. The control logic may transmit a control message to the set of mobile devices, wherein the control message is to include the command and the local execution time. In addition, the control logic may execute the command in accordance with the local execution time.

Other embodiments may include a non-transitory computer readable storage medium having a set of stored instructions which, if executed by a processor, cause a local mobile device to receive a control message from a remote mobile device, wherein the control message is to include a command and a remote execution time. The instructions may also cause a local mobile device to determine a local execution time based at least in part on the remote execution time and an offset of a remote clock of the remote mobile device relative to a local clock. The command may be executed in accordance with the local execution time.

Embodiments may also include a system having a local clock and control logic to receive a control message from a remote mobile device, wherein the control message is to include a command and a remote execution time. The control logic can also determine a local execution time based at least in part on the remote execution time and an offset of a remote clock of the remote mobile device relative to the local clock. The control logic may also execute the command in accordance with the local execution time.

Embodiments can also include a system having control logic to determine a local execution time for an image capture command, and synchronize the local execution time with a remote execution time of a remote mobile device. The system may also include an image capture module to execute the image capture command in accordance with the local execution time.

Other embodiments can include a non-transitory computer readable storage medium having a set of instructions which, if executed by a processor, cause a local mobile device to determine a local execution time for an image capture command. The instructions can also cause a local mobile device to synchronize the local execution time with a remote execution time of a remote mobile device, and execute the image capture command in accordance with the local execution time.

Turning now to FIG. 1, an environment is shown in which a plurality of mobile devices 10 (10a-10c) participate in a collaboration session in which execution 12 of a command occurs across each of the mobile devices 10 at the same moment in time. The execution 12 of the command could alternatively occur across each of the mobile devices 10 at predetermined intervals. As will be discussed in greater detail, the command could be an image capture command (e.g., focus, shutter, flash, etc.) in which the mobile devices 10 include still and/or video camera functionality, an image display command in which the mobile devices 10 include visual output functionality (e.g., touch screen), an audio output command in which the mobile devices 10 include one or more speakers, and so on. Moreover, the mobile devices 10 may have a peer-to-peer (P2P) relationship in which the environment lacks a network-based time reference.

In the illustrated example, a second mobile device (local "Mobile Device 2") 10b manages the collaboration session between itself, a first mobile device (remote "Mobile Device 1") 10a, and a third mobile device (remote "Mobile Device 3") 10c. The first and third mobile devices 10a, 10c may be considered "remote" from the perspective of the second mobile device 10b even though all three devices are in the same vicinity, so long as they reside on different platforms. The second mobile device 10b may transmit a first control message 14 to the first mobile device 10a, wherein the first control message 14 can identify the command to be executed as well as a command execution time (CET). The illustrated first mobile device 10a responds with an acknowledgement (ACK) message 16. Similarly, the second mobile device 10b may transmit a second control message 18 to the third mobile device 10c, wherein the second control message 18 identifies the command to be executed and the CET, and the third mobile device 10c replies with an ACK message 20.

As will be discussed in greater detail, the CET may be established based on the local clock of the second mobile device 10b even though the mobile devices 10 lack access to a network-based time reference. In particular, the first and third mobile devices 10a, 10c can use information regarding their respective clock offsets relative to the local clock of the second mobile device 10b to determine the appropriate moment to execute the command in question. Although the control messages 14, 18 are illustrated as unicast messages, other protocol configurations may be used. For example, the second mobile device 10b could alternatively broadcast a single control message to both the first and third mobile devices 10a, 10c using a broadcast address that is monitored by both the first and third mobile devices 10a, 10c. Moreover, the second mobile device 10b may also take into consideration the cumulative end-to-end signaling delay when scheduling the CET.

Figure 2A:
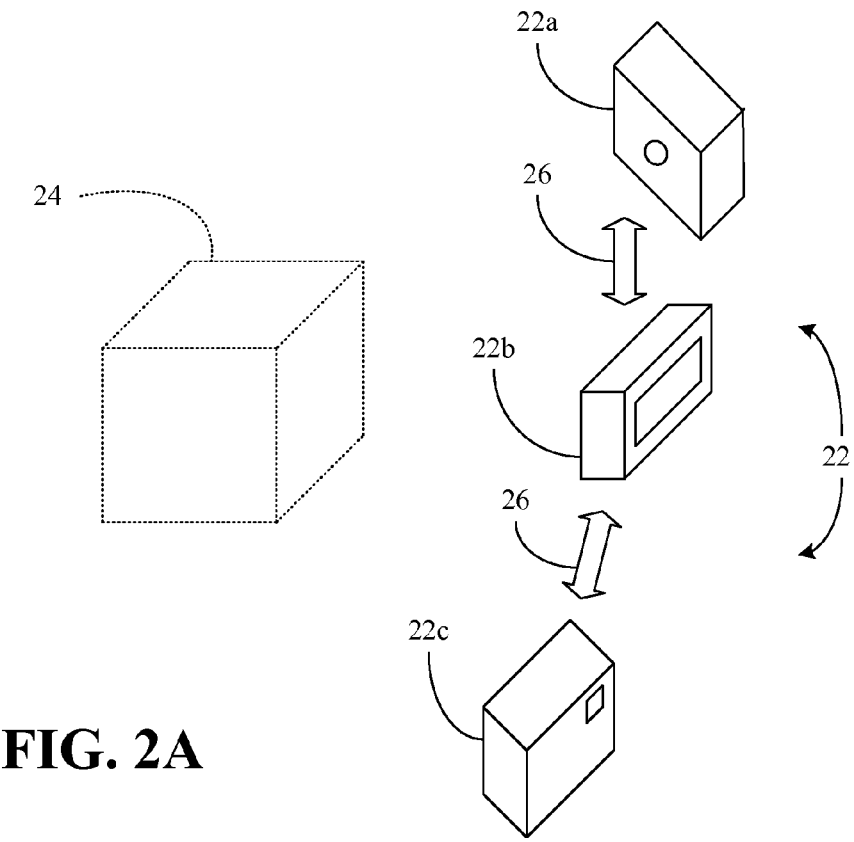
FIG. 2A is a block diagram of an example of a collaborative image capture environment according to an embodiment.
Figure 2B:
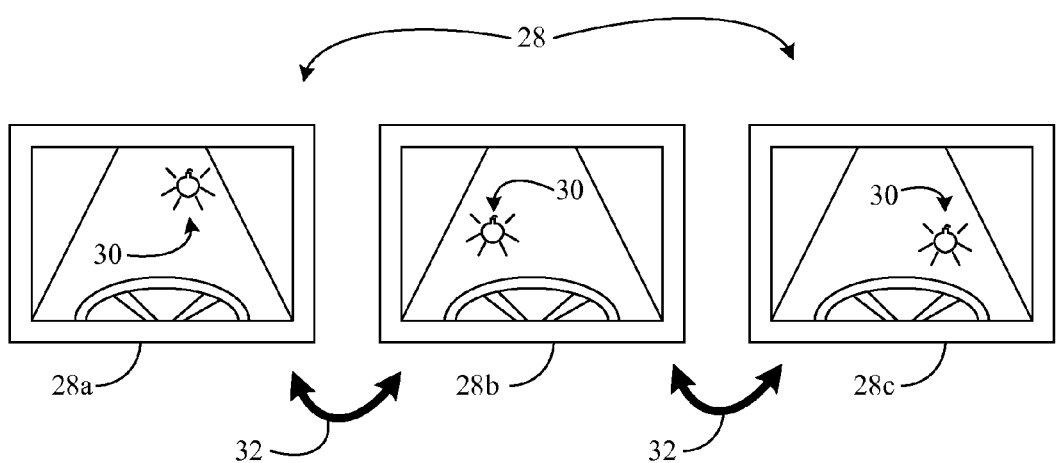
FIG. 2B is a block diagram of an example of a collaborative image display environment according to an embodiment.

FIGS. 2A and 2B show example environments in which a mobile device collaborative session as described herein might be deployed. In particular, FIG. 2A shows a collaborative image capture session in which a plurality of cameras 22 (e.g., digital camera, film camera, smart phone and/or tablet with image capture functionality, etc.) capture a simultaneous image of a time-sensitive common subject (e.g., groom kissing bride, sporting event, etc.). The cameras 22 may therefore be readily substituted for the mobile devices 10 (FIG. 1) already discussed. Thus, a command to be concurrently executed by all devices 22 might include a shutter control command and/or focus command in the example shown. By using P2P control messages 26 to align the moment at which each image is captured, the illustrated example enables the cameras 22 to obtain synchronized images that can be used to generate super resolution images, 3D images, and so on.

FIG. 2B demonstrates that a collaborative image display session may also incorporate the control messaging functionality described herein. In particular, a plurality of handheld devices (e.g., mobile Internet devices (MIDs), personal digital assistants (PDAs), wireless smart phones, media players, notebook computers, tablet devices, etc., or any combination thereof) 28 (28a-28c), can each simultaneously display a time-sensitive event such as an exploding object (e.g., bomb) 30 during real-time play of a multi-player game such as a collaborative driving game. Thus, the handheld devices 28 could be readily substituted for the mobile devices 10 (FIG. 1), already discussed, wherein control messages 32 are used to ensure that a gaming command such as an image display/animation command is concurrently executed by each of the handheld devices 28.

Figures 3, 5A:
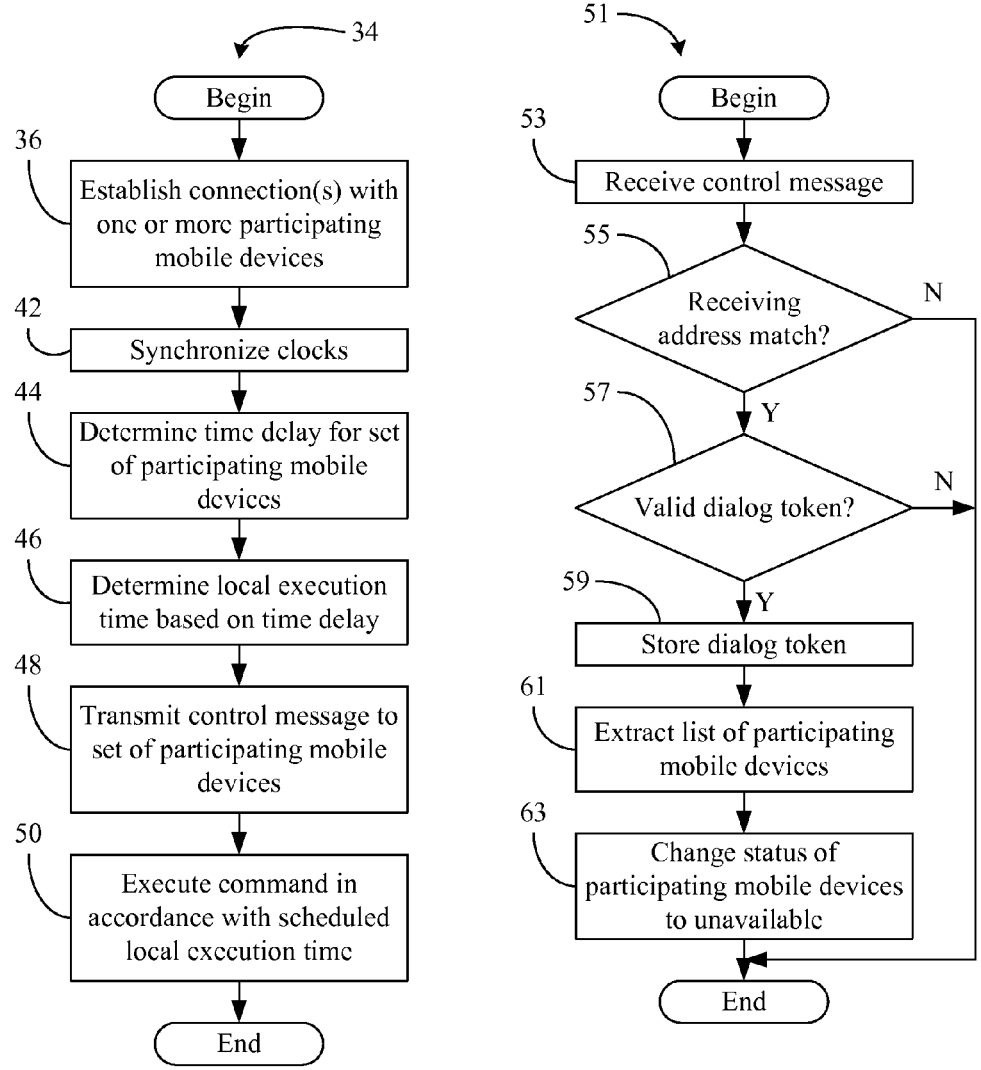
FIG. 3 is a flowchart of an example of a method of managing a mobile device collaboration session according to an embodiment.
FIG. 5A is a flowchart of an example of a method of identifying participating mobile devices in a collaborative sessions according to an embodiment.

Turning now to FIG. 3, a method 34 of managing a mobile device collaborative session is shown. The method 34 might be implemented in executable software of a local mobile device 10b (FIG. 1) as a set of logic/module instructions stored in a machine- or computer-readable medium of a memory such as random access memory (RAM), read only memory (ROM), programmable ROM (PROM), firmware, flash memory, etc., in fixed-functionality logic hardware using circuit technology such as application specific integrated circuit (ASIC), complementary metal oxide semiconductor (CMOS) or transistor-transistor logic (TTL) technology, or any combination thereof. For example, computer program code to carry out operations shown in method 34 may be written in any combination of one or more programming languages, including an object oriented programming language such as Java, Smalltalk, C++ or the like and conventional procedural programming languages, such as the "C" programming language or similar programming languages.

Processing block 36 provides for establishing a connection with one or more remote participating mobile devices. In particular, block 36 may involve detecting the presence of available mobile devices via their respective wireless network controllers (e.g., Wi-Fi controller/transceiver (e.g., IEEE 802.11, 1999 Edition, LAN/MAN Wireless LANS), Bluetooth controller/transceiver (e.g., IEEE 802.15.1-2005, Wireless Personal Area Networks)). In this regard, a network infrastructure may not be needed to establish the connection, which may be a pure P2P connection lacking a network-based time reference. Identifiers of the available mobile devices can then be output via a user interface (UI) along with a user prompt for a selection from the identifiers. Upon receipt of the selection input from the user, a set of participating mobile devices may be identified. Alternatively, the device could select the set of participating mobile devices based on received signal strength indicator (RSSI) information, GPS (Global Positioning System) location information, and so on.

Figure 4:
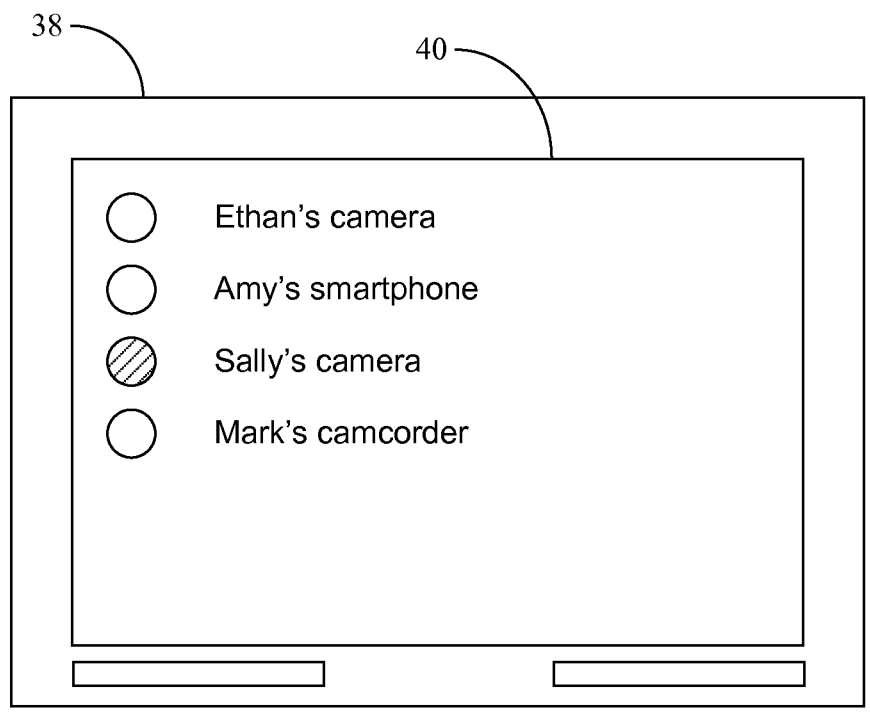
FIG. 4 is a screenshot of an example of a user interface according to an embodiment.

For example, FIG. 4 shows a mobile device 38 having a user interface 40 that displays multiple detected imaging devices. In the illustrated example, the status of each device is indicated by a solid (e.g., "Green") or hatched (e.g., "Red") dot next to the device name. A solid dot could represent that the device is not in use and available to participate in a collaborative video/picture capture session, whereas a hatched dot could represent that the device is currently in use and not available. Thus, in the illustrated example, "Ethan's camera", "Amy's smartphone" and "Mark's camcorder" are available to participate, and "Sally's camera" is not. When the managing device initiates a collaborative video capture session, control commands may be sent to the other devices that are currently available (i.e., with solid dot status). While the device are participating in the collaborative picture/video capture session, their statuses may be locally set to unavailable, which may in turn cause their statuses to appear as hatched dots on other devices in the same group.

Returning now to FIG. 3, once the participating devices have been identified, a connection may be set up between the local managing device and each of the remote participating mobile devices. For example, block 36 could involve prompting the user to identify what type of connection is preferred. In one example, there may be four connection types for a user to choose from:

Open persistent connection: if a user does not require authentication of the peer (e.g., remote) device and the user wants to save the profile of the peer device for the duration of the event in the local device, the user can choose this relationship. The profile of a peer device can be a combination of the MAC (media access control) address of a Wi-Fi or Bluetooth card, user friendly name, etc. The user may also be permitted choose the duration of the persistent connection (e.g., 4 hours, 8 hours, 24 hours, etc.). Once a persistent connection is set up, for the duration of the connection, even if the user decides to switch off the device and power on it again, the user may be able to bypass the set up process. A user might choose an open connection for various reasons: because the user can visually verify that the peer device in the vicinity/neighborhood is a trusted device; because the two users who are trying to take a picture collaboratively are far apart (e.g., on different sides of a stadium), and so on. An open connection setup can have minimum messaging overhead but may not provide a secure channel (e.g., protection for traffic transmitted between the two devices).

Open one-time connection: if a user does not choose to save the profile of the peer device in his/her respective device and if the user is not concerned about the authenticity of the peer device, the user might choose to set up an open connection. In this case, once the device is powered off, the connection setup is lost. Accordingly, the next time the user switches on his/her device, a connection may need to be set up again. This mode may be most suited for a scenario in which a user only takes one or two pictures collaboratively with another user.

Secure persistent connection: a user can choose to save the profile of a peer device into his/her respective device for the duration of an event. In this case, the profile of the peer device could be a combination of the MAC address of the Wi-Fi or Bluetooth card, user friendly name, a common secret between the local device and the remote device, etc. With a persistent connection, a device may automatically set up a connection with a known peer device each time it is switched on until the pre-defined connection time expires. If a secure connection is chosen, the device can require the peer device to authenticate with it before the connection is setup and ready to use. After the authentication procedure is successfully completed, the traffic between the two devices may be encrypted.

Secure one-time connection: the local device does not save the profile of the remote device but may require an authentication procedure before a connection is set up. After the authentication procedure is successfully completed, the traffic between the two devices can be encrypted.

Processing block 42 provides for synchronizing the local clock of the managing device with the clocks of the remote participating mobile devices. In particular, the managing device could broadcast one or more time synchronization requests that are received by the participating mobile devices, wherein each time synchronization request can include a time of departure ("ToD") stamp, as well as a number of other parameters. For example, the time synchronization request may indicate that the transmitted frame is a synchronization request, include the MAC address of the managing device, and include a receiver address (e.g., a broadcast address that is monitored by other devices in the area). In addition, the synchronization request could include a dialogue token that is used to differentiate between time synchronization request frames from different devices if there are multiple transmitting devices in the area. Moreover, the ToD stamp can be applied at the time the frame is transmitted.

Upon receipt of the time synchronization request, the participating mobile devices may determine the time of arrival (ToA) of the time synchronization request and transmit a reply to the time synchronization request. The time synchronization reply can be a unicast frame that identifies the ToA of the request as well as the ToD of the time synchronization reply. When the managing device receives each synchronization reply, it may determine the ToA of the reply and calculate a clock offset for the two devices. The calculation might be conducted as follows, $$\text{Offset} = \frac{[(T2 - T1) - (T4 - T3)]}{2} \tag{1}$$

Where T1 is the transmission time of the time synchronization request, T2 is the arrival time of the time synchronization request, T3 is the transmission time of the time synchronization reply, and T4 is the arrival time of the time synchronization reply. For instance, if the local clock of the managing device reads 1:30 pm and the offset between the local clock of the managing device and the clock of a participating mobile device is +2 mins, the managing device can determine that the clock of the participating mobile device is 1:32 pm. The above process may be repeated by the participating mobile devices to determine their clock offset relative to the clock of the managing device. By using such an approach, one device can be synchronized to multiple devices simultaneously without using a master clock of a network. Furthermore, because the time synchronization procedure is distributed, the procedure may be faster and more efficient than for each device to copy the clock values of the other devices.

Processing block 44 provides for determining a time delay for the set of participating mobile devices. The time delay determination may take into consideration that the time involved in transmitting a message between mobile devices can be a function of the operating system (OS) and hardware (HW) delays at the transmitting mobile device, the over the air (OTA) signaling delay, and the HW and OS delays at the receiving mobile device. For example, by applying the offset of each participating mobile device to one or more ToD timestamps received from the participating mobile device in question, the managing device may determine the end-to-end delay.

$$\text{Delay}_{ETE} = T4 - (T3 + \text{Offset}) \tag{2}$$

Where $\text{Delay}_{ETE}$ is the end-to-end delay associated with the participating mobile device in question, T3 is the transmission time of the message (relative to the remote clock), and T4 is the arrival time of the message (relative to the local clock). The end-to-end delay could also be averaged across multiple messages from a particular device as well as averaged across messages from the entire set of participating mobile devices. The maximum end-to-end delay for the set of participating mobile devices may therefore be used by the managing device to identify a time delay for the collaborative session. Other factors such as timing jitter, which may be calculated from multiple end-to-end delay calculations, can also be considered in the time delay determination.

Block 46 provides for determining a command execution time (CET) based on the local clock of the managing device and the time delay for the set of participating mobile devices. For example, the CET might be some moment in the future, taking into consideration the time delay associated with transferring the appropriate control messages between devices. As will be discussed in greater detail, the managing device may also determine other parameters such as a dialog token and an execution delay for each participating mobile device.

A control message is transmitted to the set of participating mobile devices at illustrated block 48. An example of the fields that might be included in the control message is shown below in Table I.

TABLE I

| Order | Information |
|---|---|
| 1 | Frame Type |
| 2 | Transmitter Address |
| 3 | Receiver (Broadcast) Address |
| 4 | Dialogue Token |
| 5 | Command Execution Time (CET) |
| 6 | Execution Delay |
| 7 | List of Participating Devices |
| ... | ... |

The frame type may identify the type of control message being transmitted, (e.g., whether the message is a focus control message, a shutter control message, a flash control message, image display/animation message, etc.). The transmitter address (TA) may be the MAC address of the transmitting device's Wi-Fi or Bluetooth card, or a universally unique device identifier that identifies the transmitting device. The receiver address (RA) may be the MAC address of the receiving device's Wi-Fi or Bluetooth card, a universally unique device identifier that identifies the receiving device, or a broadcast address that is monitored by each of the participating mobile devices. The dialogue token can be a sequence number of the control message, wherein the managing device may increment the sequence number by one for every new transmitted control message.

As already noted, the local Command Execution Time may be the time when the managing device would execute the command, and may be calculated based on the maximum end-to-end delay, and the local clock. The Delay field can define the timing offset (e.g., in microseconds) that the receiving device is to add to the Command Execution Time. For example, if a remote camera needs to execute the command at the same moment in time as the local camera, the Delay field could be zero. If, on the other hand, the collaborative session involves a sequential image capture, each participating camera may receive a different execution delay based on its position in the image capture sequence. The control message may also carry a list of devices that participate in the session, wherein each device in the list could be identified by its MAC address or other appropriate identifier. Illustrated block 50 provides for executing the command in accordance with the scheduled local execution time.

FIG. 5A shows a method 51 of identifying participating mobile devices in a collaborative session. The method 51 might be implemented in executable software of a mobile device 10$a$, 10$c$ (FIG. 1) as a set of logic/module instructions stored in a machine- or computer-readable medium of a memory such as RAM, ROM, PROM, firmware, flash memory, etc., in fixed-functionality logic hardware using circuit technology such as ASIC, CMOS or TTL technology, or any combination thereof. As already noted, a mobile device may establish a connection with the managing device in order to participate in the collaborative session along with other mobile devices, wherein the connection might be an open persistent, open one-time, secure persistent, secure one-time connection, or other type of connection.

Block 53 provides for receiving a control message. If the type of connection is a secure connection (e.g., secure persistent or secure one-time connection), block 53 may involve authenticating the control message. As already discussed, the control message may include a transmitter address, a receiver address, a dialog token, a list of participating mobile devices, and so on. If it is determined at block 55 that the receiver address (e.g., MAC address) of the command message matches an address of the receiving mobile device, a determination may be made at block 57 as to whether the dialog token is valid. Thus, block 57 might involve comparing a sequence number of the dialog token to a stored sequence number of a previous dialog token from the same transmitter, wherein the control message is ignored if the sequence number is less than or equal to the stored sequence number.

If the sequence number is greater than the stored sequence number, however, illustrated block 59 overwrites the stored sequence number with the sequence number of the dialog token. Block 59 could also involve transmitting an acknowledgement (ACK) message to the managing device at the transmitter address identified in the control message. In this regard, if the type of connection is a persistent connection (e.g., open persistent or secure persistent connection), the participating mobile device may store a profile for the managing device that includes the MAC address, a user friendly name, a common secret, etc. Illustrated block 61 extracts a list of participating mobile devices from the control message, wherein the statuses of the participating mobile devices may be changed to "unavailable" at block 63.

Figure 5B:
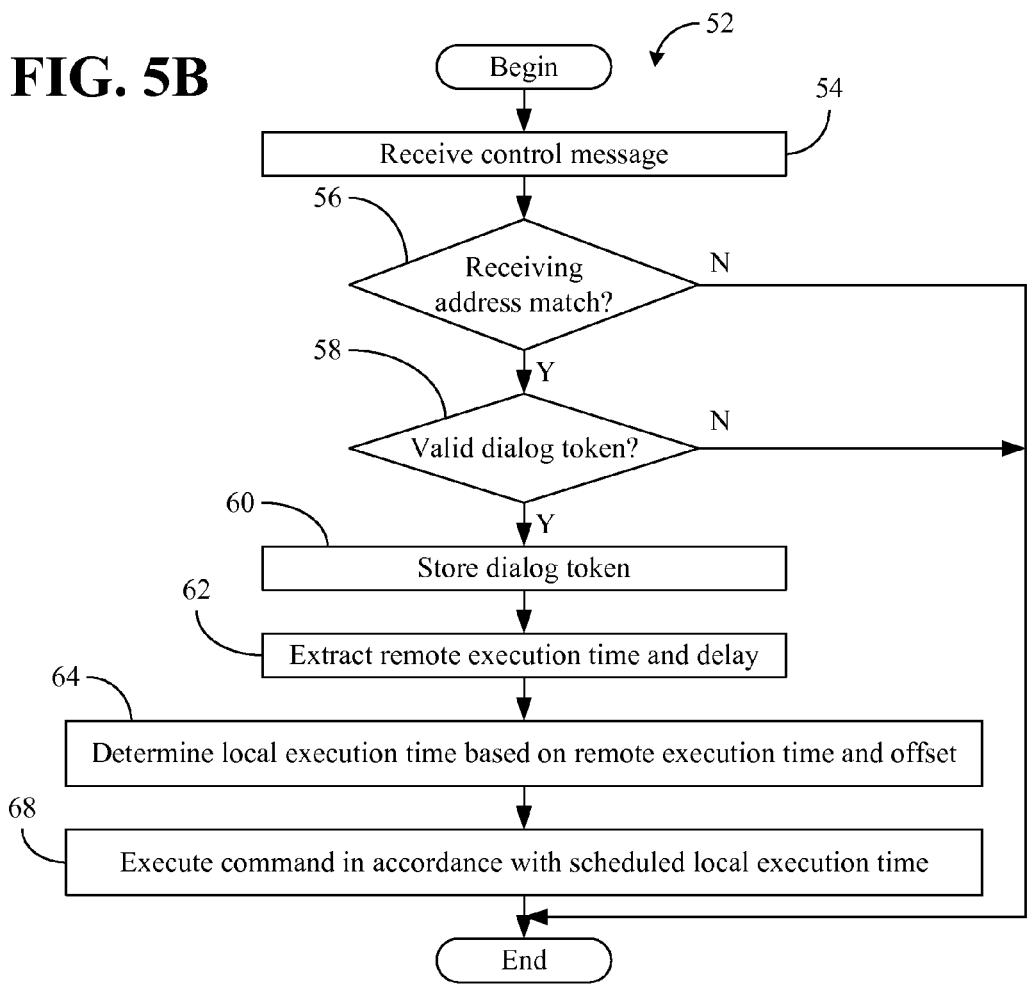
FIG. 5B is a flowchart of an example of a method of participating in a mobile device collaborative session according to an embodiment.

Turning now to FIG. 5B, a method 52 of participating in a mobile device collaborative session is shown. The method 52 might be implemented in executable software of a mobile device 10$a$, 10$c$ (FIG. 1) as a set of logic/module instructions stored in a machine- or computer-readable medium of a memory such as RAM, ROM, PROM, firmware, flash memory, etc., in fixed-functionality logic hardware using circuit technology such as ASIC, CMOS or TTL technology, or any combination thereof. As already noted, the participating mobile device may establish a connection with the managing device, wherein the connection might be an open persistent, open one-time, secure persistent, secure one-time connection, or other type of connection.

Block 54 provides for receiving a control message. If the type of connection is a secure connection (e.g., secure persistent or secure one-time connection), block 54 may involve authenticating the control message. The control message may include a transmitter address, a receiver address, a command, a dialog token, a command execution time (CET) that is based on the remote clock of the managing device, and so on. If it is determined at block 56 that the receiver address (e.g., MAC address) of the command message matches an address of the participating mobile device, a determination may be made at block 58 as to whether the dialog token is valid. Thus, block 58 might involve comparing a sequence number of the dialog token to a stored sequence number of a previous dialog token from the same transmitter, wherein the control message is ignored if the sequence number is less than or equal to the stored sequence number. If the sequence number is greater than the stored sequence number, however, illustrated block 60 overwrites the stored sequence number with the sequence number of the dialog token. Block 60 could also involve transmitting an acknowledgement (ACK) message to the managing device at the transmitter address identified in the control message. In this regard, if the type of connection is a persistent connection (e.g., open persistent or secure persistent connection), the participating mobile device may store a profile for the managing device that includes the MAC address, a user friendly name, a common secret, etc.

The CET of the remote managing device may be extracted from the control message at block 62, as well as the execution delay. As already noted, if the command is to be executed concurrently by the participating mobile devices, the execution delay may be zero (e.g., null). Illustrated block 64 determines the local execution time of the command for the participating mobile device based on the remote CET and the offset of the remote managing device's clock relative to the local clock of the participating mobile device. For example, the local execution time might be calculated as follows, $$CET+Delay+Offset\_Device1\_Device2 \quad (3)$$

Wherein Delay is the execution delay, if any. The command may be executed at block 68 in accordance with the scheduled local execution time.

Figure 6:
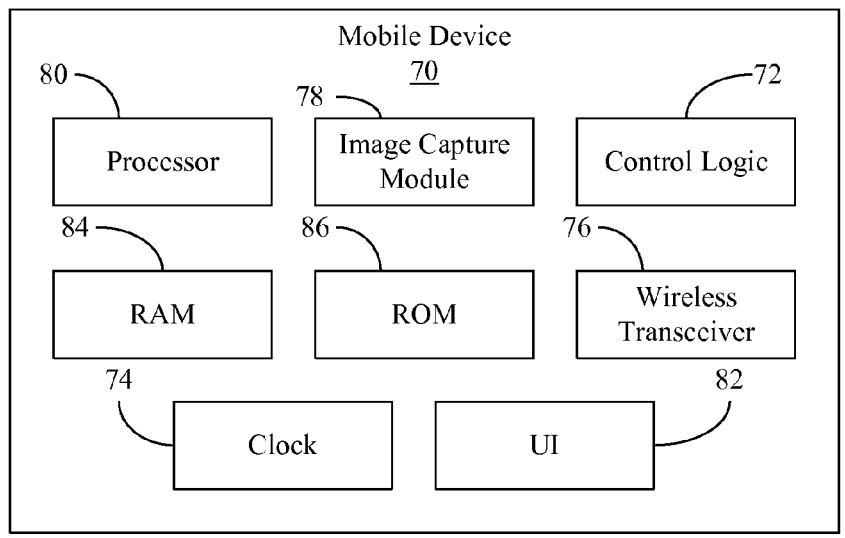
FIG. 6 is a block diagram of an example of a system according to an embodiment.

FIG. 6 shows one example of a mobile device 70 including control logic 72 and a local clock 74. If the mobile device 70 functions as a managing device in a collaborative session, the control logic 72 may be operable to determine a time delay associated with a set of one or more remote participating mobile devices, determine a local execution time for a command based at least in part on the local clock and the time delay, and transmit a control message to the set of one or more remote participating mobile devices via a wireless (e.g., Wi-Fi, Bluetooth) transceiver 76, wherein the control message includes the command and the local execution time.

If, on the other hand, the mobile device 70 functions as a participating mobile device in a collaborative session, the control logic 72 may be operable to receive a control message from a remote managing device via the wireless transceiver 76, wherein the control message includes a command and a remote execution time. The control logic 72 may also determine a local execution time based at least in part on the remote execution time and an offset of a remote clock of the remote mobile device relative to the local clock 74.

In either capacity, the illustrated control logic 72 executes the command in accordance with the scheduled local execution time, wherein the execution of the command is collaborated with the other participating mobile devices. The mobile device 70 can also include an image capture module 78 to facilitate execution of image capture commands such as shutter, focus and flash commands, and a processor 80 that may include one or more processor cores (not shown), where each core may be fully functional with instruction fetch units, instruction decoders, level one (L1) cache, execution units, and so on. The processor 80 could execute the control logic 72 to the extent that the control logic 72 may include instructions.

The illustrated mobile device 70 also includes a user interface (UI) 82 that enables a user to interact with and perceive information from the mobile device 70. Thus, the UI 82 may include functionality similar to that of the UI 40 (FIG. 4), already discussed, and can enable the user to select participating mobile devices for the collaborative session. The UI 82 could also enable the user to select the type of connection (e.g., open persistent, open one-time, secure persistent, secure one-time connection) for the collaborative session. The mobile device 70 may also include RAM 84, ROM 86, flash memory (not shown), etc. to store images, videos, timing offsets, device profiles, authentication data, dialog token sequence numbers, device statuses, control logic instructions, etc.

Embodiments described herein are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:
1. An apparatus comprising:
    control logic in one or more of a first mobile device and a second mobile device to,
        exchange a control message between the first mobile device and the second mobile device over a peer-to-peer connection, wherein the control message includes a command, an execution delay including a timing offset, and a first execution time indicating a time when one of the first mobile device and the second mobile device that generates the control message is to execute the command, and
        synchronize with the first execution time a second execution time indicating a time when the other of the first mobile device and the second mobile device that receives the control message is to execute the command, wherein the other of the first mobile device and the second mobile device is to apply the timing offset to the first execution time to determine the second execution time, and a module in the first mobile device and a module in the second mobile device to execute the command based on the first execution time and the second execution time.

2. The apparatus of claim 1, wherein the first mobile device and the second mobile device include a camera and the command includes an image capture command.

3. The apparatus of claim 2, wherein the image capture command is to cause the first mobile device and the second mobile device to synchronously capture a time-sensitive common subject.

4. The apparatus of claim 3, wherein the module of the first mobile device and the module of the second mobile device are to concurrently execute the image capture command to synchronously capture a time-sensitive common subject.

5. The apparatus of claim 4, wherein an image to be captured by the first mobile device and an image to be captured by the second mobile device are to be used to generate one or more of a high resolution image and a three-dimensional image.

6. The apparatus of claim 3, wherein the module of the first mobile device and the module of the second mobile device are to sequentially execute the image capture command to synchronously capture a time-sensitive common subject.

7. The apparatus of claim 1, wherein the first mobile device and the second mobile device include a display and the command includes an image display command.

8. The apparatus of claim 7, wherein the image display command is to cause the first mobile device and the second mobile device to synchronously display a time-sensitive common subject.

9. The apparatus of claim 8, wherein the module of the first mobile device and the module of the second mobile device are to concurrently execute the image display command to synchronously display a time-sensitive common subject.

10. The apparatus of claim 1, wherein the first mobile device and the second mobile device include a speaker and the command includes an audio output command.

11. A non-transitory computer readable storage medium comprising a set of instructions which, when executed by a processor, cause one or more of a first mobile device and a second mobile device to:
exchange a control message between the first mobile device and the second mobile device over a peer-to-peer connection, wherein the control message includes a command, an execution delay including a timing offset, and a first execution time indicating a time when one of the first mobile device and the second mobile device that generates the control message is to execute the command;
synchronize with the first execution time a second execution time indicating a time when the other of the first mobile device and the second mobile device that receives the control message is to execute the command, wherein the other of the first mobile device and the second mobile device is to apply the timing offset to the first execution time to determine the second execution time; and
execute the command based on the first execution time and the second execution time.

12. The medium of claim 11, wherein the instructions, when executed, cause the first mobile device and the second mobile to synchronously capture a time-sensitive common subject.

13. The medium of claim 12, wherein the instructions, when executed, cause the first mobile device and the second mobile device to concurrently execute an image capture command to synchronously capture a time-sensitive common subject.

14. The medium of claim 12, wherein the instructions, when executed, cause the first mobile device and the second mobile device to sequentially execute an image capture command to synchronously capture a time-sensitive common subject.

15. The medium of claim 11, wherein the instructions, when executed, cause the first mobile device and the second mobile to synchronously display a time-sensitive common subject.

16. A method comprising:
exchanging a control message between a first mobile device and a second mobile device over a peer-to-peer connection, wherein the control message includes a command, an execution delay including a timing offset, and a first execution time indicating a time when one of the first mobile device and the second mobile device that generates the control message is to execute the command;
synchronizing with the first execution time a second execution time indicating a time when the other of the first mobile device and the second mobile device that receives the control message is to execute the command, wherein the other of the first mobile device and the second mobile device is to apply the timing offset to the first execution time to determine the second execution time; and
executing the command based on the first execution time and the second execution time.

17. The method of claim 16, wherein the first mobile device and the second mobile synchronously capture a time-sensitive common subject.

18. The method of claim 17, wherein the first mobile device and the second mobile device concurrently execute an image capture command to synchronously capture a time-sensitive common subject.

19. The method of claim 17, the first mobile device and the second mobile device sequentially execute an image capture command to synchronously capture a time-sensitive common subject.

20. The method of claim 16, wherein the first mobile device and the second mobile synchronously display a time-sensitive common subject.

* * * * *